March 7, 1967 M. P. STELLER 3,307,449

OPTICAL MEASURING DEVICE

Filed June 28, 1965

INVENTOR.
MICHAEL P. STELLER
BY Jerome R. Cox
ATTORNEY 3,307,449
OPTICAL MEASURING DEVICE
Michael P. Steller, 3400 N. Broadway, Grove City,
Ohio 43123
Filed June 28, 1965, Ser. No. 467,375
8 Claims. (Cl. 88—24)

This invention relates to an optical device which provides for the simultaneous measurement of and inspection of small objects and particularly to a device for measuring and inspecting transparent objects such as contact lenses.

It is frequently necessary for an opthalmologist, optician or optometrist to measure the diameter and thickness of a contact lens. It is also frequently necessary for him to inspect such a lens for scratches, sharp edges or other irregularities which could affect the efficacy of the lens or the comfort of the wearer of the lens. Various inspection devices have been displosed to the art. For example, Vegors et al. in United States Patent No. 3,111,881 issued November 26, 1963, describes an optical device for projecting an image of a contact lens on a small screen and describes an adjustable lens positioning device for positioning the contact lens relative to the focal point of the image projecting means, the positioning device comprising a double-sided adhesive attached to the end of a rod.

The devices of the art have not solved the problems of critical inspection of a contact lens particularly in the interpretation of shadows projected on small screens and have not solved the problem of simultaneous measurement of and critical inspection of a contact lens.

It was my conclusion that this problem could best be approached by, first, seeking means to project the lens image in a manner to make the interpretation of various types of shadows more meaningful, and second, to seek means for projecting an image of a measuring device for superposition on the lens image. However, two objects to be projected on a screen together from the focal point of a single lens may have significantly different depths. This fact leads to the specific problem of providing a simple optical device wherein the two juxtaposed objects—one part of a contact lens and a ruler for example, can be moved together by one simple adjustment for purposes of sharpening their single superimposed projected image and also wherein the two objects may be moved relative to each other by a second, but different, simple adjustment in order to effect a sharp image of the ruler together with a different part of the contact lens.

Objects

It is therefore an object of my invention to provide a device which will provide for the simultaneous measurement and critical inspection of small objects, particularly transparent objects such as crystals or contact lenses.

It is a further object of my invention to provide a device which is especially suitable for the simultaneous measurement of various dimensions of a contact lens and for the critical inspection of the lens for scratches, irregularities along the edges thereof, plastic flow lines or other internal flaws, etc.

It is a further object of my invention to provide for such measurement and inspection in a greatly magnified image of an object even though the object has appreciable depth.

It is a specific object of my invention to provide an optical device which projects a substantially enlarged image of a contact lens superimposed on the image of measuring indicia from a juxtaposed ruler positioned at the focal point of the same convex lens; wherein the superimposed image may be sharpened by a simple "one-hand" adjustment of the position of the juxtaposed combination relative to the focal point of the convex lens, but without changing the relative position of the contact lens and the ruler; and wherein the relative position of the ruler and the contact lens (to measure and examine a different part of the contact lens) may be changed by a simple, but different, "one-hand" adjustment.

Other objects and features of the invention will be apparent from a reading of this specification and the accompanying claims and from a consideration of the drawings which illustrate a specific embodiment of the invention.

Figure 1:
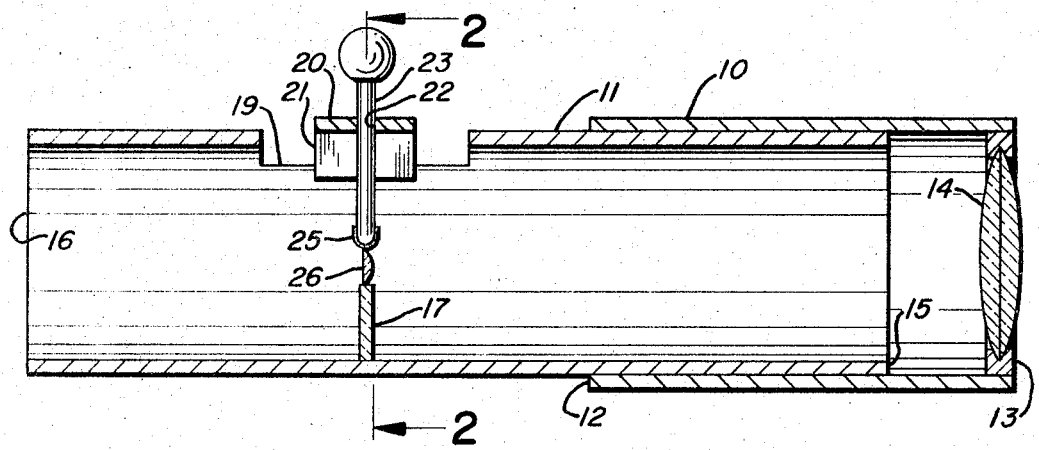
FIG. 1 is an elevation view, in cross section, of an optical device which embodies features of my invention.

With more detailed reference to the drawings, a housing for the object to be examined and for the optical elements of my device is shown in the form of two cylinders, an outer cylinder 10 and an inner cylinder 11 positioned for telescopic movement relative to each other. The outer, and forward, cylinder 10 is provided with an open rearward end 12 and a closed forward end 13, said forward end 13 or light-exiting end, being closed by means of a convex lens 14 positioned transversely to the cylinder axis. I have used a convex lens with a focal length of four inches, for example, but other focal lengths are suitable for the projection of a relatively large image on the screen (not shown).

The inner cylinder has two open ends, the forward end 15 being telescoped into the outer cylinder and the rearward end 16, or light-admitting end, being adapted to admit light coaxially into the cylinders. A transparent ruler 17 bearing opaque measuring indicia 18 is secured radially inward therefrom into the light path through to the inside wall of the inner cylinder 11 and extends the cylinders. The ruler 17 is positioned so that it can be brought to the focal point of the convex lens 14 by telescopic movement of the inner cylinder 11 relative to the outer cylinder 10.

The inner cylinder 11 is also provided with a rectangularly shaped opening 19 in the wall opposite the ruler 17. An adjustable sliding member 20 fitted with guide tabs 21 and a hole 22 is fitted for longitudinal movement in the wall opening 19. A rod 23 provided with a knob 24 on its outer end and a double-sided adhesive tape 25 on the inner end extends radially inwardly through the hole 22 in the sliding member 20. A contact lens 26 is shown attached to the adhesive tape 25. As a substitute for the double-sided adhesive tape 25 I have used a slit (not shown) in the end of the rod 23 to hold the object being examined.

The various structures may be made of suitable materials. The cylinders 10, 11 may be constructed of metal, plastic, or other suitable rigid material. The convex lens 14 is made preferably of good optical glass in order that it project a good quality image. The ruler 17 may be plastic or glass and the positioning rod 23 and sliding member 20 may be glass, plastic, metal or wood.

Operation

Figure 4:
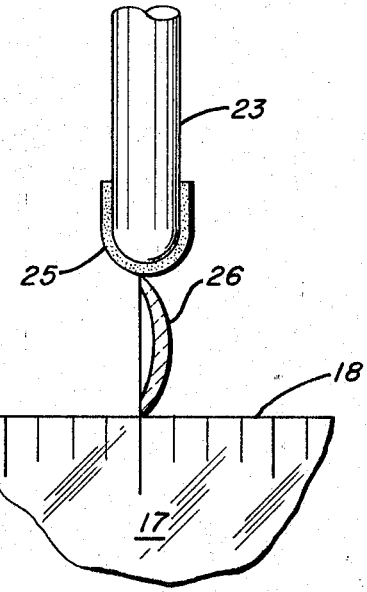
FIG. 4 is an enlarged elevation view of the end of the adjustable positioning device of the invention.
Figure 3:
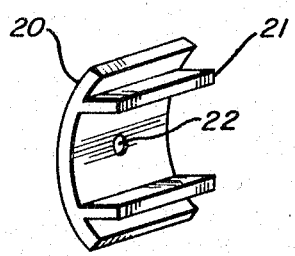
FIG. 3 is a perspective view, somewhat enlarged, of the adjustable sliding element of a specific embodiment of my invention.

The contact lens 26 or other small object to be measured and examined is attached to the adhesive tape 25 on the positioning rod 23 in any position desired (such as the one illustrated in FIG. 4). The sliding element 20 is positioned in the wall opening 19 and the positioning rod 23 is inserted in the hole 22 in the sliding element 20. The positioning rod 23 is pushed radially inward and the sliding element 20 adjusted longitudinally until the contact lens 26 is positioned, for example, immediately in front of the measuring indicia 18 on the transparent ruler 17. The device is then pointed at a large screen (not shown) and light is directed axially into the cylinders 10, 11 via the rearward opening 16 of the inner cylinder 11. The light goes through the ruler 17, past the contact lens 26, through the convex lens 14 and is projected to the screen positioned about fifteen feet away, for example. If the image on the screen is not sharp, the position of the contact lens 26 and the position of the ruler 17 are adjusted simultaneously by moving the inner cylinder either in or out, as required, of the outer cylinder to bring the juxtaposed contact lens and ruler to the focal point of the convex lens 14. The projected image of the contact lens 26 on the screen is then measured by the superimposed projected image of the measuring indicia 18 while the image of the contact lens 26 is being examined for scratches or other irregularities. These irregularities are shown up quite distinctly and their character is easily interpreted by a mere glance at the large and resolved shadows on the large screen.

The positioning rod may then be rotated to bring various slides or edges of the contact lens into view.

Figure 2:
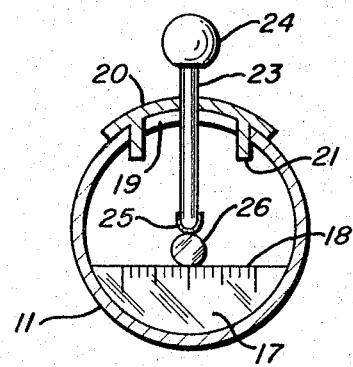
FIG. 2 is a cross sectional view of FIG. 1 taken along the line 2—2.

Similarly, and if desired, the poistioning rod 23 may be adjusted to position the contact lens 26 immediately above the measuring indicia 18 (as shown in FIGS. 2 and 4) for measurements. Thus, various dimensions of the contact lens may be measured when it is in the position shown in FIG. 4 or the contact lens can be lowered to a position in front of or behind the ruler 17 in a manner to cast a shadow on the measuring indicia 18. The projection of such a shadow gives a very exact measurement. The contact lens 26, after being measured and inspected in the position shown in FIG. 4, can be rotated through 90 degrees, for example, for a measurement of its diameter.

It will be apparent that all parts of a contact lens, or any other small object of appreciable depth, cannot be brought into sharp focus at the same time. Thus, if the ruler 17 and the front edge of an object (e.g. a crystal) are both in focus and it is desired to measure and inspect the back edge of the crystal, this is done by longitudinal adjustment of the sliding element until the ruler and said back edge are in juxtaposition. When the ruler and said back edge are in juxtaposition, any further sharpening is done by moving both objects simultaneously, that is, by adjusting the inner cylinder 11 telescopically relative to the outer cylinder 10. Both these adjustments are simple "one-hand" adjustments and the entire object under examination can be measured and critically inspected at various edges and sides by progressive manipulation of the sliding element 20 and the relative position of the inner and outer cylinders 10, 11.

While the device shown in the drawings constitutes a preferred embodiment of the invention, it is to be understood that the invention is not limited to this embodiment, and that changes may be made therein without departing from the scope of the invention which is defined in the appended claims.

I claim:

1. An optical device for use with convex lens-containing means to provide for the simultaneous inspection and measurement of a small object in an enlarged projection thereof on a screen, said device comprising:
    (1) a housing provided with a light-admitting opening and a light-exiting opening, said light-exiting opening positioned for optical cooperation with said lens;
    (2) a transparent ruler bearing measuring indicia positioned in the light path between said openings and adjustable to the focal point of said lens;
    (3) means for moving said object to various positions in juxtaposition to said indicia in order to adjust its position relative to said indicia; and
    wherein light passes said indicia, said juxtaposed object, and through said lens to effect the projection on said screen of relatively large superimposed images of said indicia and said object.

2. An optical device which provides for the simultaneous inspection and measurement of a small object in an enlarged projection thereof on a screen, said device comprising:
    (1) a housing provided with a light-admitting opening and a light-exiting opening;
    (2) a convex lens positioned in said light-exiting opening;
    (3) a transparent ruler bearing measuring indicia positioned in the light path between said openings and adjustable to the focal point of said lens; and
    (4) means for moving said object to various positions in juxtaposition to said indicia in order to adjust its position relative to said indicia;
    and wherein light passes said indicia, said juxtaposed object, and through said lens to effect the projection on said screen of relatively large superimposed images of said indicia and said object.

3. The device according to claim 2 wherein said housing comprises a cylinder and said convex lens is positioned at one end thereof transversely to the axis of said cylinder.

4. The device according to claim 2 wherein said housing comprises a cylinder and said means comprises a longitudinally adjustable rod extending radially inwardly from the wall of said cylinder to the proximity of said ruler.

5. The device according to claim 2 wherein said housing comprises a cylinder provided with an opening in the wall thereof near said focal point and said means comprises a longitudinally adjustable rod insertable radially inwardly through said wall opening and adhesive means attached to the inner end of said rod for securing said small object thereto.

6. The device according to claim 2 wherein said housing comprises two cylinders, one positioned partially telescopically within the other; wherein said convex lens is positioned transversely across an end of the outer cylinder; wherein the inner cylinder is provided with an opening in the portion of the wall thereof outside said telescoped part and near said focal point; and wherein said means comprises a longitudinally adjustable rod insertable radially through said wall opening and adhesive means attached to the inner end of said rod for securing said small object thereto.

7. An optical device which provides for the simultaneous inspection and measurement of a small object is an enlarged projection thereof on a screen, said device comprising:
    (1) a first cylinder provided with an open end and a closed end;
    (2) a convex lens positioned transversely of the axis of said first cylinder and being the means by which said closed end of said first cylinder is closed;
    (3) a second cylinder provided with two open ends, said second cylinder being adapted to fit partially telescopically into the open end of said first cylinder, said second cylinder being provided with an opening in the wall thereof outside said telescoped part and near the focal point of said lens, and an open end of said second cylinder being adapted to admit light coaxially into said cylinders;
    (4) a transparent ruler bearing opaque measuring indicia, said ruler positioned inside said second cylinder transversely to the axis thereof, positioned in a plane which passes through said opening, positioned at approximately the focal point of said lens, and positioned in a manner such that the measuring indicia thereon is in the path of light passing coaxially through said necond cylinder;

(5) a longitudinally adjustable slide member positioned for movement in said opening, said slide member being provided with a radially extending hole;
(6) a rod insertable for radial in and out movement in said hole in said slide member to bring the inner end of said rod adjacent said ruler indicia; and
(7) adhesive means attached to the inner end of said rod for securing said small object thereto:

and wherein light entering said second cylinder passes said indicia, said juxtaposed object and through said lens to effect the projection on a screen of relatively large superimposed images of said indicia and said object.

8. An optical device which provides for the simultaneous inspection and measurement of a small object in an enlarged projection thereof on a screen, said device comprising:
(1) a housing provided with a light-admitting opening and a light exiting opening;
(2) a convex lens positioned in said light exiting opening;
(3) a transparent ruler bearing measuring indicia positioned in the light path between said openings and adjustable to the focal point of said lens; and
(4) means for positioning said object in juxtaposition to said indicia;

wherein light passes said indicia, said juxtaposed object, and through said lens to effect the projection on said screen of relatively large superimposed images of said indicia and said object; wherein said housing comprises two cylinders, one positioned partially telescopically within the other; wherein said convex lens is positioned transversely across an end of the outer cylinder; wherein the inner cylinder is provided with an opening in the portion of the wall thereof outside said telescoped part and near said focal point; and wherein said means comprises a longitudinally adjustable rod insertable radially through said wall opening and adhesive means attached to the inner end of said rod for securing said small object thereto.

References Cited by the Examiner

UNITED STATES PATENTS

| 3,111,881 | 11/1963 | Vegors et al. | 88—14 |
| 3,171,883 | 3/1965 | Jones | 88—39 X |

FOREIGN PATENTS

| 11,588 | 5/1903 | England. |

NORTON ANSHER, *Primary Examiner.*

F. L. BRAUN, *Assitant Examiner.*